(12) United States Patent
Kojima et al.

(10) Patent No.: US 7,162,344 B2
(45) Date of Patent: Jan. 9, 2007

(54) OCCUPANT DETECTION SYSTEM

(75) Inventors: Mikihito Kojima, Wako (JP); Masashi Yoshifuku, Wako (JP); Toyohiko Shindo, Wako (JP); Nobuhiro Koyota, Wako (JP); Naotaka Kumakiri, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 274 days.

(21) Appl. No.: 10/987,906

(22) Filed: Nov. 12, 2004

(65) Prior Publication Data

US 2005/0140210 A1    Jun. 30, 2005

(30) Foreign Application Priority Data

Nov. 20, 2003  (JP) .............................. 2003-390937

(51) Int. Cl.
*B60R 21/01*    (2006.01)
(52) U.S. Cl. ..................... 701/45; 280/735; 180/273
(58) Field of Classification Search ................. 701/45; 702/173; 280/728.1, 730.1, 730.2, 734, 735; 180/271, 273; 73/862.325
See application file for complete search history.

(56) References Cited

U.S. PATENT DOCUMENTS

| | | | |
|---|---|---|---|
| 6,109,117 A | 8/2000 | Stanley et al. | |
| 6,201,480 B1* | 3/2001 | Aoki ........................... | 340/667 |
| 6,348,663 B1* | 2/2002 | Schoos et al. .............. | 177/144 |
| 6,367,837 B1 | 4/2002 | Hamada et al. | |
| 2001/0040056 A1* | 11/2001 | Schoos et al. .............. | 177/144 |
| 2002/0163171 A1 | 11/2002 | Kraft et al. | |
| 2005/0072249 A1* | 4/2005 | Maeda et al. .......... | 73/862.046 |

FOREIGN PATENT DOCUMENTS

| | | |
|---|---|---|
| DE | 101 43 326 A1 | 3/2003 |
| EP | 1 491 408 A1 | 12/2004 |
| GB | 1 467 769 A | 3/1977 |
| JP | 10-39045 | 2/1998 |

OTHER PUBLICATIONS

Patent Abstracts of Japan, Crew Detecting Sensor, Publication Date: Feb. 13, 1998.
Front page of WO 2005/000637 A1, Seat Occupancy Sensor, Publication Date: Jan. 6, 2005. (English abstract for EP 1 491 408 A1).
Front page of WO 03/026934 A1, Device for the Weight Classification of People, Publication Date: Apr. 3, 2003. (English abstract for DE 101 43 326 A1).

* cited by examiner

*Primary Examiner*—Gary Chin
(74) *Attorney, Agent, or Firm*—Rankin, Hill, Porter & Clark LLP

(57) ABSTRACT

An occupant detection system includes: a front weight sensor group formed from two weight sensors that are connected in series and arranged to the left and right on an upper face of a seat cushion; and a rear weight sensor group formed from two weight sensors that are connected in series and arranged to the left and right on the upper face of the seat cushion. The weight sensor groups are connected in parallel to each other. Regardless of whether an occupant sits on a front or rear part of a seat, since the load of the buttocks always acts on both left and right sides of the seat cushion, two series-connected left and right weight sensors of at least one of the plurality of weight sensor groups are both turned on without fail, thereby reliably detecting the occupant.

1 Claim, 5 Drawing Sheets

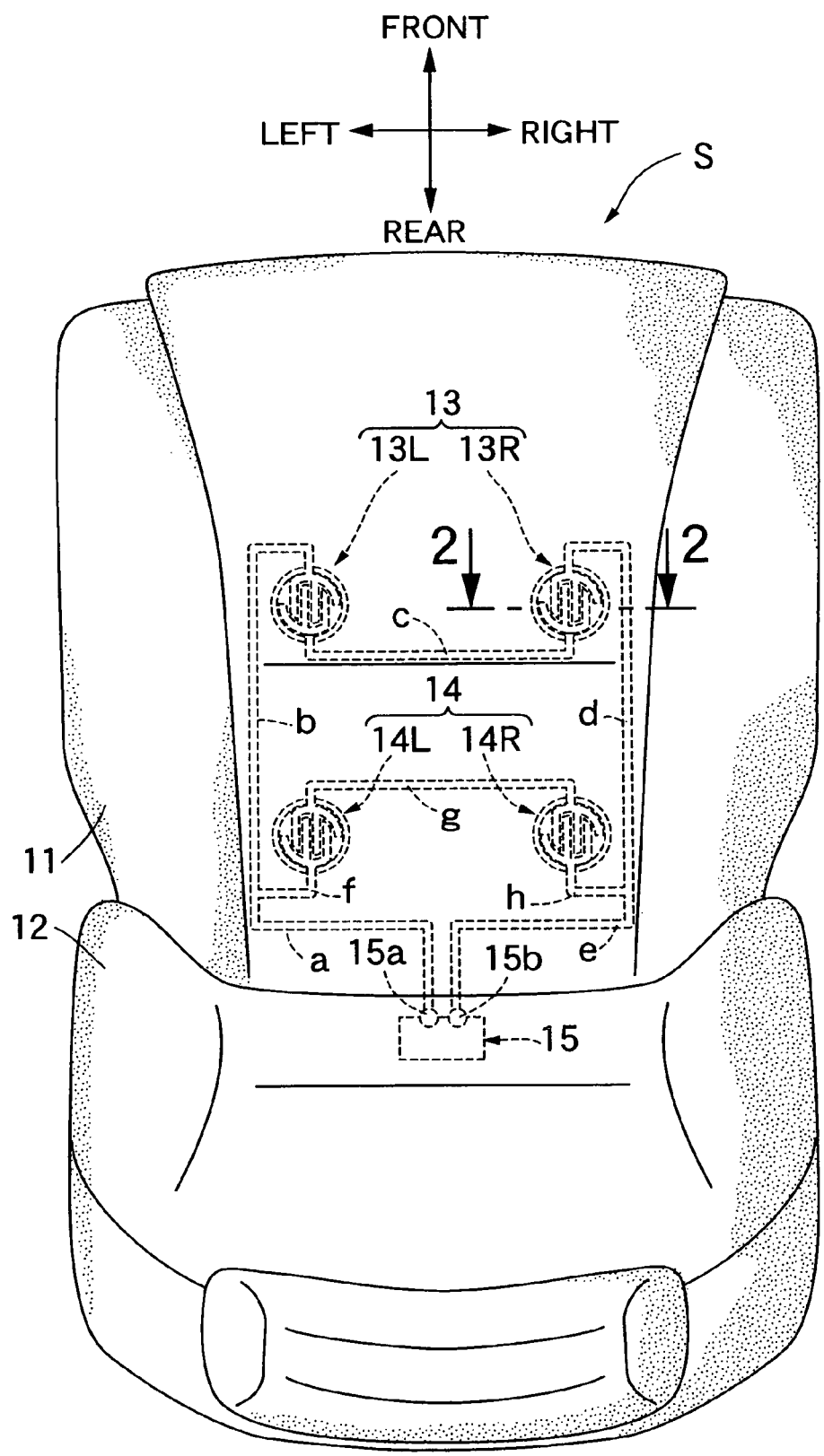

OCCUPANT DETECTION SYSTEM

BACKGROUND OF THE INVENTION

1. Field of the Invention

The present invention relates to an occupant detection system having a plurality of weight sensors arranged in a seat cushion in order to detect an occupant sitting on a seat, the weight sensors being turned on by the weight of the occupant.

2. The Related Art

An airbag system for a passenger seat of a motor vehicle detects whether or not an occupant is seated on a seat, and carries out control so that, if an occupant is seated when the vehicle is involved in collision, an airbag is deployed, and if an occupant is not seated, the airbag is not deployed.

In an occupant detection system disclosed in Japanese Patent Application Laid-open No. 10-39045 that is used for such a purpose, a plurality of weight sensors that are turned on by the weight of an occupant are electrically connected in parallel to each other on an upper face of a seat cushion, and when at least one of the weight sensors is turned on, the system detects that an occupant is seated.

However, in the above-mentioned conventional arrangement, the system detects that an occupant is seated when any one of the plurality of weight sensors electrically connected in parallel to each other is turned on, and therefore if only one weight sensor is turned on by an article such as a handbag placed on the seat cushion, there is a possibility that seating of an occupant might be erroneously detected.

SUMMARY OF THE INVENTION

The present invention has been accomplished under the above-mentioned circumstances, and it is an object thereof to prevent an article placed on a seat cushion from being erroneously detected as an occupant when detecting an occupant sitting on a seat by means of a plurality of weight sensors provided in the seat cushion.

In order to attain the object, in accordance with the present invention, there is provided an occupant detection system comprising a plurality of weight sensors arranged in a seat cushion in order to detect an occupant sitting on a seat, the weight sensors being turned on by the weight of the occupant, wherein a plurality of weight sensor groups are arranged in the front-and-rear direction, each weight sensor group comprising two weight sensors that are connected in series and arranged to the left and right on an upper face of the seat cushion, wherein the plurality of weight sensor groups are connected in parallel to each other, and wherein an occupant is detected when two of the weight sensors of at least one weight sensor group are both turned on.

A front weight sensor group 13 and a rear weight sensor group 14 of embodiments correspond to the weight sensor groups of the present invention.

In accordance with the arrangement of the present invention, regardless of whether an occupant sits on a front or rear part of the seat, since the load of the buttocks always acts on both left and right sides of the seat cushion, two series-connected left and right weight sensors of at least one weight sensor group of the plurality of weight sensor groups are both turned on without fail, whereby the occupant can be reliably detected. When an article such as a handbag is placed on the seat cushion, since the probability of both left and right weight sensors of one group being turned on is low, the possibility of the article being erroneously detected as an occupant is low.

The above-mentioned object, other objects, characteristics, and advantages of the present invention will become apparent from preferred embodiments that will be described in detail below by reference to the attached drawings.

BRIEF DESCRIPTION OF THE DRAWINGS

FIG. 1 is a plan view of a seat equipped with weight sensors according to a first embodiment of the present invention.

DESCRIPTION OF THE PREFERRED EMBODIMENTS

Figure 2A:
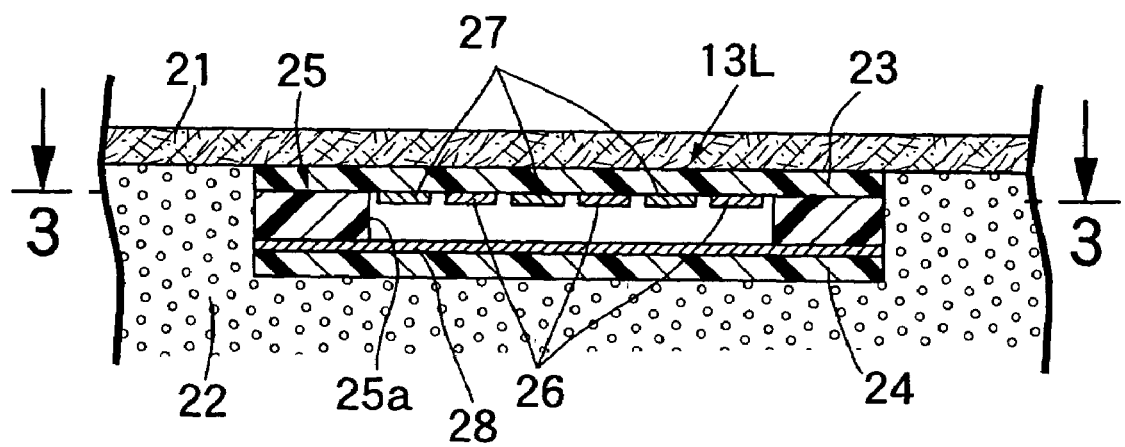
FIGS. 2A and 2B are enlarged sectional views along line 2—2 in FIG. 1.

As shown in FIG. 1, a seat S for a motor vehicle includes a seat cushion 11 and a seat back 12. Four weight sensors 13L and 13R; 14L and 14R having an identical structure are arranged inside a cover of an upper face of the seat cushion 11. The two weight sensors 13L and 13R forming a front weight sensor group 13 are arranged so as to be spaced from each other in the lateral direction in a front part of the seat cushion 11. The two weight sensors 14L and 14R forming a rear weight sensor group 14 are arranged so as to be spaced from each other in the lateral direction in a rear part of the seat cushion 11. The two weight sensors 13L and 13R on the front side are connected in series, via harnesses a, b, c, d, and e, to a pair of terminals 15a and 15b of a controller 15 housed in the rear part of the seat cushion 11. The two weight sensors 14L and 14R on the rear side are connected in series, via harnesses a, f, g, h, and e, to the pair of terminals 15a and 15b of the controller 15. The front weight sensor group 13 and the rear weight sensor group 14 are connected in parallel to each other.

The structures of the weight sensors 13L and 13R; 14L and 14R are now described with reference to FIGS. 2A and 2B and FIG. 3. Since the structures of the four weight sensors 13L and 13R; 14L and 14R are all identical, the structure of the weight sensor 13L is described as the representative thereof.

The weight sensor 13L is disposed so as to be held between a lower face of a cover 21 and an upper face of a cushion material 22 of the seat cushion 11. The weight sensor 13L is formed from an upper film 23 and a lower film 24 made of a resilient material such as a synthetic resin, a spacer 25 that has a circular opening 25a and is held between the upper film 23 and the lower film 24, flexible first and second electrodes 26 and 27 made of carbon, etc. and fixed to a lower face of the upper film 23 so as to face the opening 25a, and a flexible circular third electrode 28 made of carbon, etc. and fixed to an upper face of the lower film 24 so as to face the opening 25a. The first and second electrodes 26 and 27, which are formed into a comb shape, are arranged so as to mesh with each other, and are connected in series in a circuit linking the pair of terminals 15a and 15b of the controller 15.

Figure 2B:
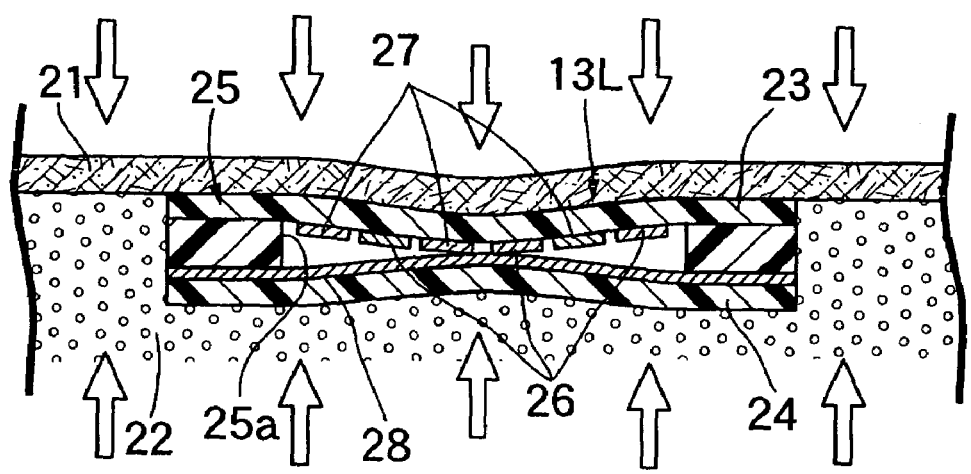
Figure 3:
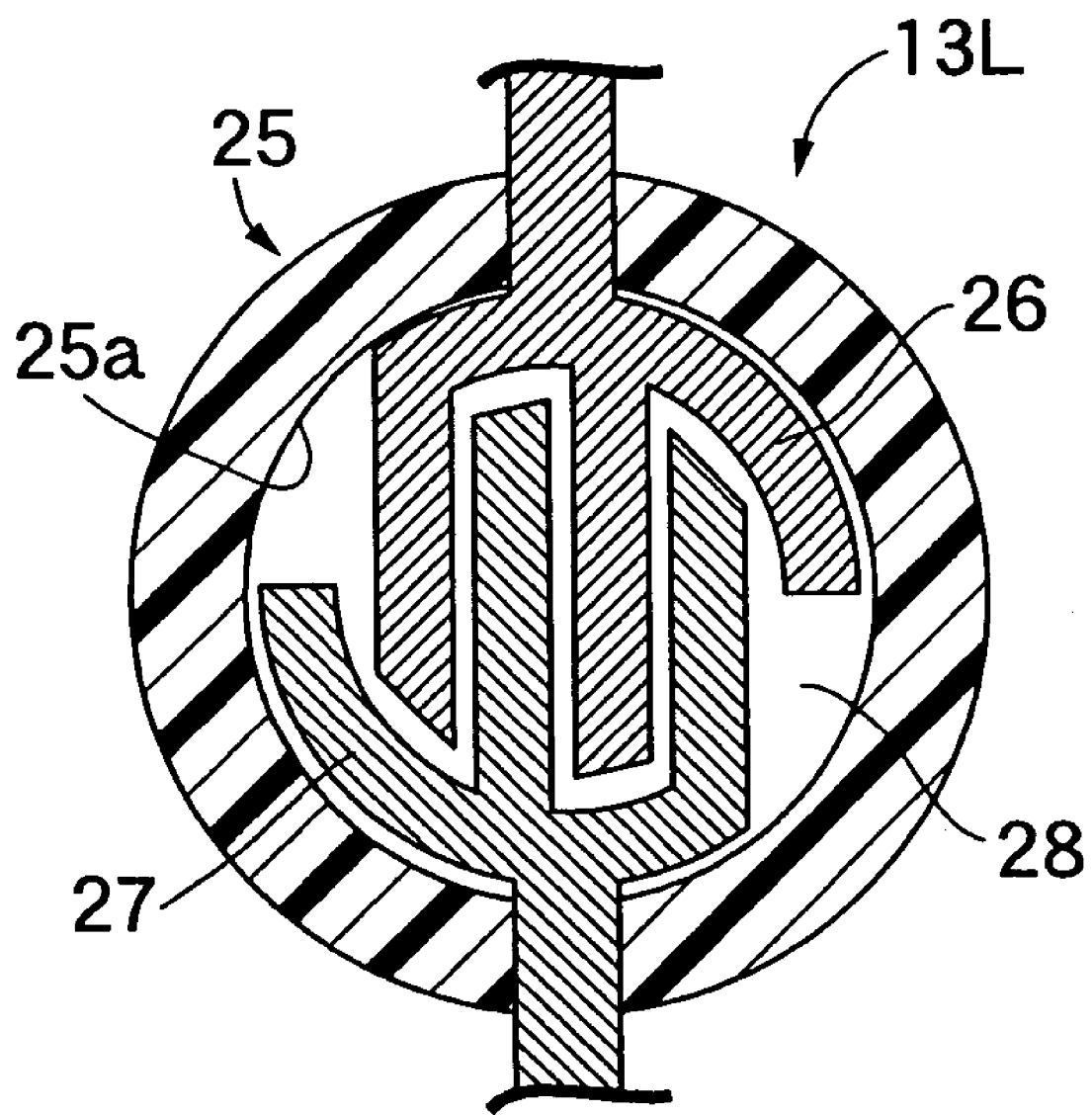
FIG. 3 is a view along arrowed line 3—3 in FIG. 2.

Therefore, when the weight of an occupant acts on the cover 21 of the seat cushion 11, as shown in FIG. 2B, the upper film 23 and the lower film 24 of the weight sensor 13L deform so as to be pushed into the opening 25a of the spacer 25, so that the first and second electrodes 26 and 27 which are fixed to the upper film 23 come into contact with the third electrode 28 which is fixed to the lower film 24 within the opening 25*a*. As a result, the first and second electrodes 26 and 27 are connected to each other via the third electrode 28.

When an occupant sits on the seat S, if the sitting posture is such that the occupant sits on a front or rear part of the seat S, the load of the buttocks of the occupant acts mainly on the front left and right of the seat cushion 11, the two weight sensors 13L and 13R connected in series and forming the front weight sensor group 13 are both turned on, and the pair of terminals 15*a* and 15*b* of the controller 15 are connected to each other, so that the seated occupant is detected. If the sitting posture is such that the occupant sits on a rear part of the seat S, the load of the buttocks of the occupant acts mainly on the rear left and right of the seat cushion 11, the two weight sensors 14L and 14R connected in series and forming the rear weight sensor group 14 are both turned on, and the pair of terminals 15*a* and 15*b* of the controller 15 are connected to each other, so that the seated occupant is detected. When the occupant sits on a middle part of the seat S, the two weight sensors 13L and 13R of the front weight sensor group 13 and the two weight sensors 14L and 14R of the rear weight sensor group 14 might all be turned on, but if either the two weight sensors 13L and 13R on the front side or the two weight sensors 14L and 14R on the rear side are turned on, the occupant can be detected reliably.

On the other hand, when an article such as a handbag is placed on the seat cushion 11, at most one of the four weight sensors 13L and 13R; 14L and 14R is turned on, and the possibility that the two weight sensors 13L and 13R on the front side would be both turned on is low and the possibility that the two weight sensors 14L and 14R on the rear side would be both turned on is low, thereby reducing the probability of the article being erroneously detected as an occupant.

In this way, since the arrangement and wiring of the weight sensors 13L and 13R; 14L and 14R are determined while taking into consideration the shape of the buttocks of an occupant sitting on the seat S, the detection performance of the occupant detection system can be enhanced by means of a simple structure.

Figure 4A:
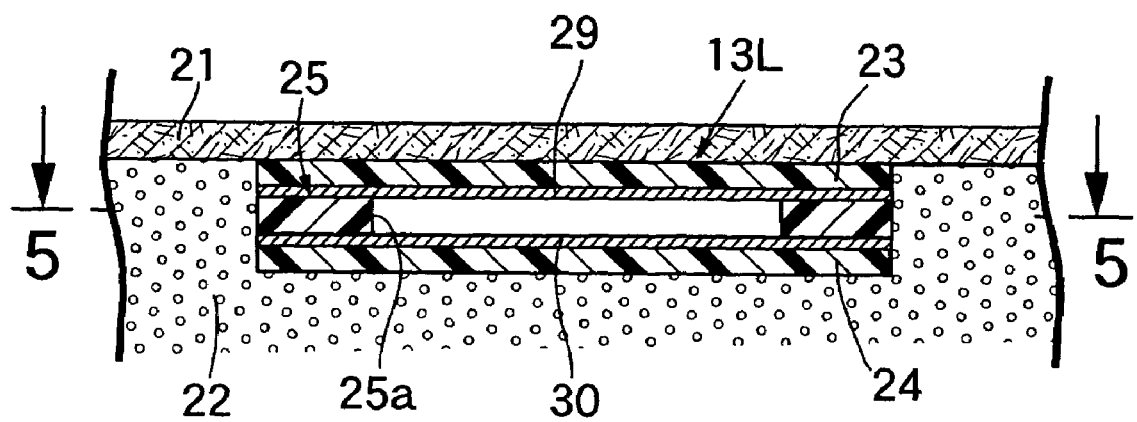
FIGS. 4A and 4B are views, corresponding to FIGS. 2A and 2B, of a weight sensor of a second embodiment.

The structures of weight sensors 13L and 13R; 14L and 14R of a second embodiment are now described with reference to FIGS. 4A, 4B, and FIG. 5. In the second embodiment, other than the structures of the weight sensors 13L and 13R; 14L and 14R, the arrangement is the same as that of the first embodiment. Also, the structures of the four weight sensors 13L and 13R; 14L and 14R of the second embodiment are all identical. Therefore, the weight sensor 13L is described as the representative thereof.

The weight sensor 13L is disposed so as to be held between a lower face of a cover 21 and an upper face of a cushion material 22 of a seat cushion 11. The weight sensor 13L is formed from an upper film 23 and a lower film 24 made of a resilient material such as a synthetic resin, a flexible circular first electrode 29 made of carbon, etc. and fixed to a lower face of the upper film 23, a flexible circular second electrode 30 made of carbon, etc. and fixed to an upper face of the lower film 24, and a spacer 25 that has a circular opening 25*a* and is held between the first and second electrodes 29 and 30. The first and second electrodes 29 and 30 are each connected in series in a circuit linking a pair of terminals 15*a* and 15*b* of a controller 15.

Figure 4B:
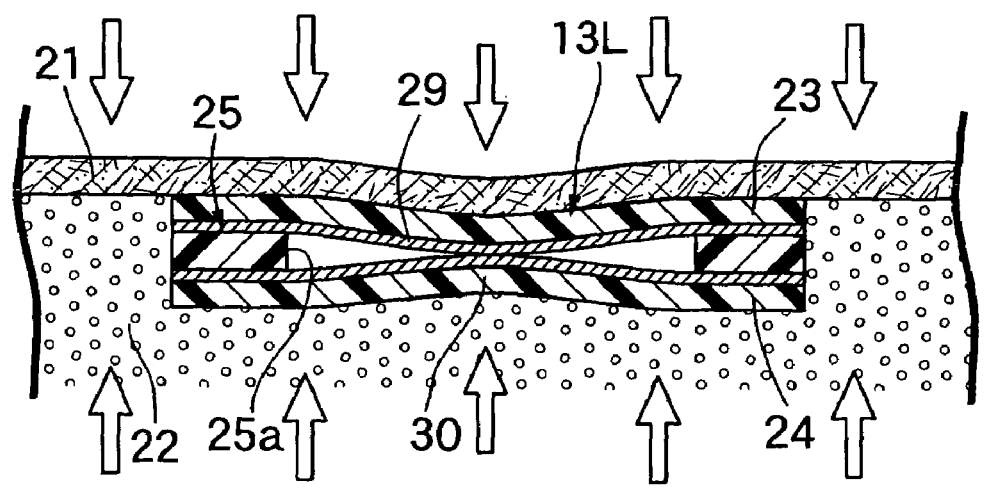
Figure 5:
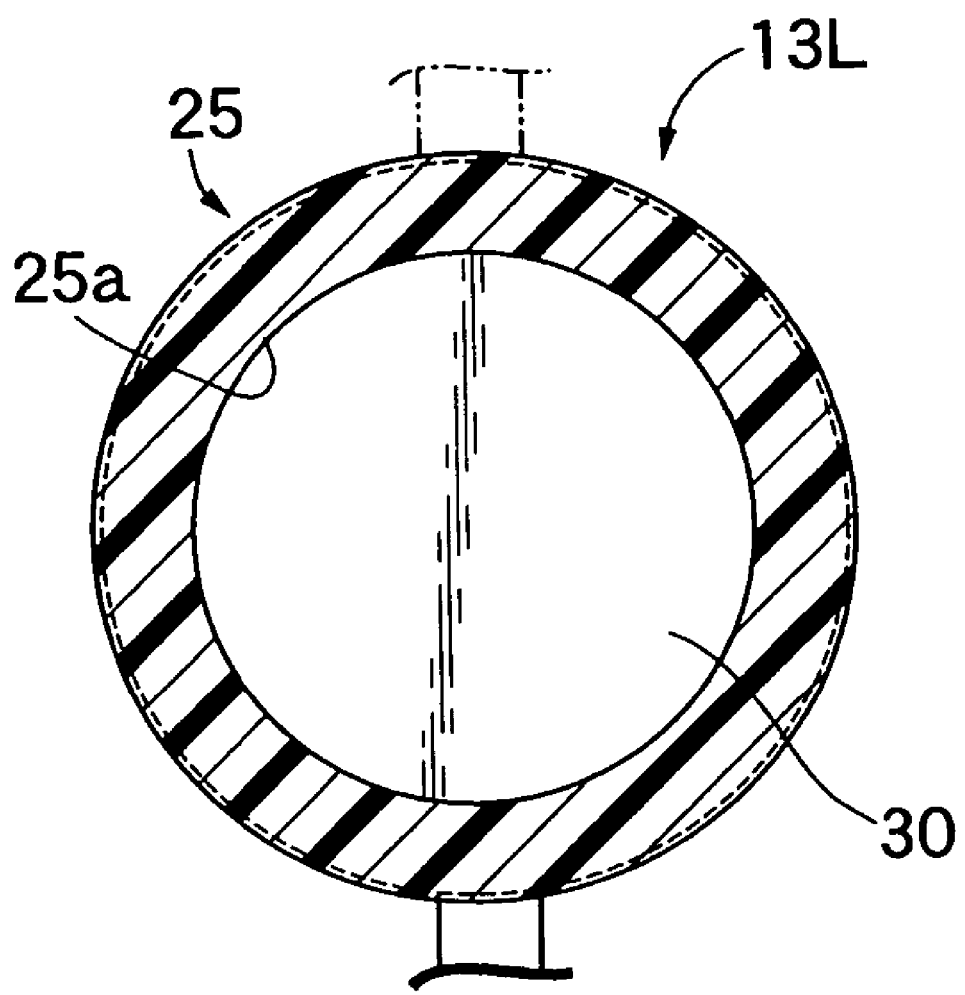
FIG. 5 is a view from arrowed line 5—5 in FIG. 4.

Therefore, when the weight of an occupant acts on the cover 21 of the seat cushion 11, as shown in FIG. 4B, the upper film 23 and the lower film 24 of the weight sensor 13L deform so as to be pushed into the opening 25*a* of the spacer 25, and the first electrode 29 which is fixed to the upper film 23 and the second electrode 30 which is fixed to the lower film 24, come into contact with each other within the opening 25*a*.

In this way, also in accordance with this second embodiment, the same effects as those of the first embodiment can be obtained.

Although embodiments of the present invention have been described in detail above, the present invention can be modified in a variety of ways without departing from the subject matter of the present invention.

For example, in the embodiments, the front weight sensor group 13 and the rear weight sensor group 14 are provided, but three or more weight sensor groups connected in parallel to each other may be arranged side by side in the front-and-rear direction.

Furthermore, the structures of the weight sensors 13L and 13R; 14L and 14R are not limited to those of the embodiments.

What is claimed is:

1. An occupant detection system comprising a plurality of weight sensors arranged in a seat cushion in order to detect an occupant sitting on a seat, the weight sensors being turned on by the weight of the occupant, wherein a plurality of weight sensor groups are arranged in the front-and-rear direction, each weight sensor group comprising two weight sensors that are connected in series and arranged to the left and right on an upper face of the seat cushion, wherein the plurality of weight sensor groups are connected in parallel to each other, and wherein an occupant is detected when two of the weight sensors of at least one weight sensor group are both turned on.

* * * * *